United States Patent Office 2,872,743
Patented Feb. 10, 1959

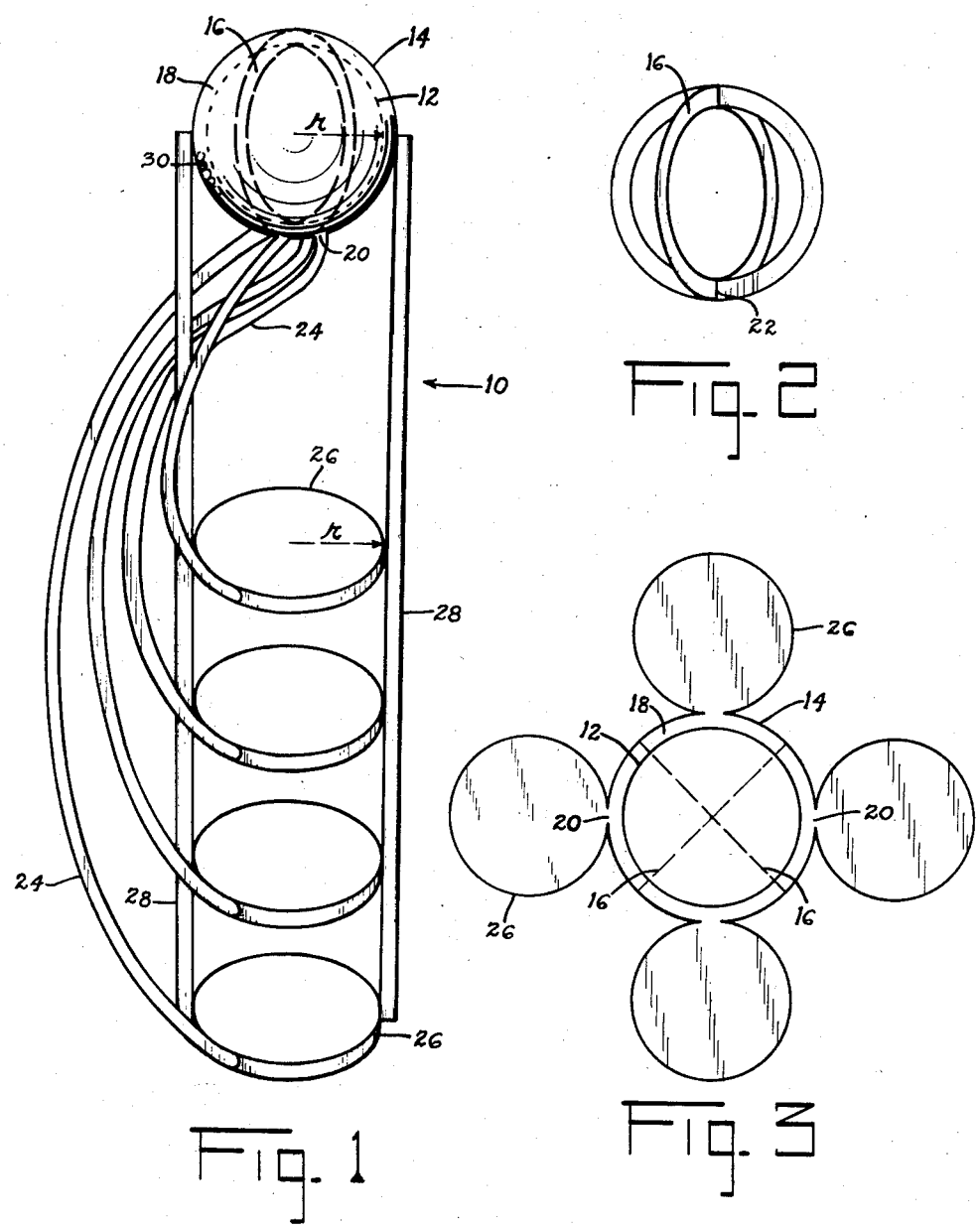

2,872,743

DEMONSTRATOR FOR THE FORMULA FOR THE SURFACE OF A SPHERE

Herbert J. Feldhake, Chicago, Ill.

Application March 7, 1957, Serial No. 644,700

12 Claims. (Cl. 35—34)

(Granted under Title 35, U. S. Code (1952), sec. 266)

The invention described herein may be manufactured and used by or for the Government of the United States of America for governmental purposes without the payment of any royalties thereon or therefor.

This invention relates to a device providing a physically meaningful demonstration of mathematical formulas, and in particular, to such a device for the demonstration of the formula for the area of the surface of a sphere.

Mathematics is an abstract subject which is generally taught by means of symbols and figures drawn upon a blackboard. It is a well-known fact that many pupils find it difficult to learn by this method, but are aided in their learning by physical demonstrations of abstract principles and the properties of geometrical forms.

The present invention provides a device for demonstrating the physical meaning of mathematical formulas containing terms of the area and volume type (second and third order terms). Terms on one side of the formula are represented by areas or volumes formed in a containing structure preferably fabricated from transparent plastic material. Terms on the other side of the formula are represented by other areas or volumes of simple, easily comprehended, geometrical forms, such as squares, rectangles or cubes, equivalent in total area or volume, respectively, to the total area or volume of the terms on the first side of the formula. The areas or volumes representing the terms on one side of the formula communicate with those on the other side. A freely mobile fluid material, preferably spherical pellets, covers the total area or fills the total volume representing all terms on one side of the formula. Equivalence of both sides of the formula is demonstrated by transferring the fluid material to the areas or volumes corresponding to the terms on the other side of the formula.

An object of the invention is to provide a device particularly useful in teaching mathematics.

Another object is to provide a device capable of furnishing a physically meaningful demonstration of a mathematical formula containing second or third order terms.

A further object is to provide a device capable of furnishing a physically meaningful demonstration of the formula for the area of the surface of a sphere.

Still another object is to provide a device which enables students to more quickly and easily understand the meaning of certain mathematical formulas and to remember them for a longer period of time.

Other objects and many of the attendant advantages of this invention will be readily appreciated as the same becomes better understood by reference to the following detailed description when considered in connection with the accompanying drawings wherein:

Fig. 1 is a modified perspective view of an embodiment of the invention,

Fig. 2 illustrates the arrangement of the orthogonal partition rings, and

Fig. 3 is a plan cross-sectional view of another embodiment of the invention.

In Fig. 1, an inner sphere 12 is enclosed by an outer sphere 14, the spheres being separated by partitions in the form of a pair of circular rings 16 arranged orthogonally to each other. To avoid confusion, only one ring is shown in Fig. 1, the arrangement of the rings being more clearly illustrated in Fig. 2.

The partitions 16 thus divide the space 18 between the spheres 12 and 14 into four equal compartments. The outer sphere 14 contains four apertures 20 located near the lower intersection 22 of the rings 16, each aperture connecting with a different one of the four compartments.

A hollow tube 24 extends from each aperture 20 to an aperture (not shown) in one of the four disk-like cylinders 26, thereby providing communication between each compartment and a different one of the cylinders 26. The cylinders 26 are identical, each having an inner radius equal to the outer radius of the inner sphere 12. The depth of the internal space inside each cylinder is equal to the width of the inter-spherical space 18. For the sake of simplicity, the thickness of the material composing the cylinders and spheres is not shown in the drawing.

The spheres and cylinders may be rigidly supported, if necessary, by a pair of rods 28 secured to their outer peripheries as shown, or by any other suitable means.

Other physical arrangements of the spheres and cylinders are possible, of course, within the scope of the invention. For example, the cylinders 26 may be attached directly to the surface of the outer sphere 14 at 90 degree intervals along the equatorial plane, as illustrated in Fig. 3. Communication between the cylinders 26 and the inter-spherical space 18 is provided in this case by the apertures 20 alone. Reversible valve devices (not shown) should be provided at the apertures 20 to permit the fluid material to pass in one direction only at any specific time. Thus, when the fluid material is in the inter-spherical space 18, the valves are set to allow passage of the material into the cylinders 26, and when the cylinders 26 have been filled, the valves can be set to permit passage of the material back to the inter-spherical space 18.

A sufficient quantity of freely mobile material to completely cover the surface of the inner sphere 12 is contained in the space 18 between the spheres. This fluid material preferably consists of spherical pellets 30, such as marbles or buckspot, small enough in diameter to permit free movement but large enough to prevent the piling of one pellet 30 above another within the inter-spherical space 18. The dimensions of the apertures 20 and the pipes 24 must be sufficient to allow free transfer of the fluid material between the spheres and cylinders.

The freely mobile material may also comprise fluids such as sand or colored liquid, in which event the structure 10 must be leak-proof and sufficient fluid material to completely occupy the volume of the inter-spherical compartments must be employed.

For the best visual demonstration, at least the outer sphere 14 and the cylinders 26 should preferably be fabricated from transparent material such as transparent plastic or glass. The structure 10 can then be built as a single integrated unit.

If non-transparent material is employed, the structure 10 must be built so that the pipes 24 are manually removable, thereby permitting inspection of the interior of the cylinders 26 and of the inter-spherical space 18 through the apertures 20.

The formula for the areas of the surface of a sphere is $4\pi r^2$, where $r$ is the radius of the sphere. The product $\pi r^2$ is also equal to the area of a circle having a radius $r$. Each of the cylinders 26 has a radius $r$ and a circular area $\pi r^2$. Thus, the area of the surface of the sphere 12 is equal to the combined circular areas of the four cylinders 26.

To demonstrate the equivalence of the surface area of the sphere 12 to the combined area of the four cylinders 26, the structure 10 is held in such position that the pellets 30 completely fill the inter-spherical compartments. The structure 10 is then inverted so that the pellets 30 are transferred through the apertures 20 and pipes 24 into the hollow spaces inside the cylinders 26. The pellets 20 are then seen to completely cover the circular area of each of the four disks 26.

If the embodiment of Fig. 3 is employed and the pellets 30 are in the cylinders 26, the valves are set to allow passage of the pellets 30 into the inter-spherical compartments. The device is then rotated permitting the contents of each cylinder 26 to empty in turn into its associated compartment. The valves are then reversed and the demonstration is initiated by rotating the device so as to fill each of the four cylinders 26 with pellets 30.

Obviously many modifications and variations of the present invention are possible in the light of the above teachings. It is therefore to be understood that within the scope of the appended claims the invention may be practiced otherwise than as specifically described.

What I claim is:

1. A device for providing a physical demonstration of the mathematical formula for the area of the surface of a sphere comprising, in combination: a pair of concentric spheres, the inner sphere being spaced from the outer sphere; four hollow cylinders, each having an inner radius equal to the outer radius of said inner sphere and a rectangular cross-section in a normal plane through a diameter, the internal depth of said rectangular cross-section being equal to that of the space between said concentric spheres; freely mobile fluid material in sufficient quantity to completely occupy the inner-spherical space; and means providing communication between said inter-spherical space and each of said cylinders, said means being of sufficient dimension to permit transfer of said freely mobile fluid material between said inter-spherical space and said cylinders.

2. A device as set forth in claim 1, wherein said cylinders and outer sphere are fabricated from transparent plastic.

3. A device as set forth in claim 1, wherein said freely mobile fluid material comprises spherical pellets.

4. A device for providing a physical demonstration of the mathematical formula for the area of the surface of a sphere comprising, in combination: a pair of concentric spheres, the inner sphere being spaced from the outer sphere; four hollow cylinders, each having an inner radius equal to the outer radius of said inner sphere and a rectangular cross-section in a normal plane through a diameter, the internal depth of said rectangular cross-section being equal to that of the space between said concentric spheres; spherical pellets in sufficient quantity to cover the surface area of said inner sphere in a single layer, the diameter of said pellets being greater than half but less than the full width of said inter-spherical space so that the pellets move into the space freely but cannot form more than a single layer; and means providing communication between said inter-spherical space and each of said cylinders, said means being of sufficient dimension to permit transfer of said pellets between said inter-spherical space and said cylinders.

5. A device for providing a physical demonstration of the mathematical formula for the area of the surface of a sphere comprising, in combination: a pair of concentric spheres; a pair of flat rings arranged orthogonally to each other encircling the outer surface of the inner sphere, said rings acting to space the spheres from each other and to divide the inter-spherical space into four equal compartments; four hollow cylinders, each having an inner radius equal to the outer radius of the inner sphere and a rectangular cross-section in a normal plane through a diameter, the internal depth of said rectangular cross-section being equal to that of the inter-spherical space; freely mobile fluid material in sufficient quantity to completely occupy the inter-spherical space; and means providing communication between each of said inter-spherical compartments and a different one of said cylinders, said means being of sufficient dimension to permit transfer of said freely mobile fluid material between each said compartment and its associated cylinder.

6. A device as set forth in claim 5, wherein said cylinders and outer sphere are fabricated from transparent plastic.

7. A device as set forth in claim 5, wherein said freely mobile fluid material comprises spherical pellets.

8. A device as set forth in claim 5, wherein said communication means comprises a plurality of pipes.

9. A device for providing a physical demonstration of the mathematical formula for the area of the surface of a sphere comprising, in combination: a pair of concentric spheres; a pair of flat rings arranged orthogonally to each other encircling the outer surface of the inner sphere, said rings acting to space the sphees from each other and to divide the inter-spherical space into four equal compartments; four hollow cylinders, each having an inner radius equal to the outer radius of the inner sphere and a rectangular cross-section in a normal plane through a diameter, the internal depth of said rectangular cross-section being equal to that of the inter-spherical space; spherical pellets in sufficient quantity to completely cover the surface area of said inner sphere in a single layer, the diameter of said pellets being greater than half but less than the full width of said interspherical space so that the pellets move into the space freely but cannot form more than a single layer; and means providing communication between each of said inter-spherical compartments and a different one of said cylinders, said means being of sufficient dimension to permit transfer of said freely mobile material between each said compartment and its associated cylinder.

10. A device as set forth in claim 9, wherein said cylinders and outer sphere are fabricated from a transparent plastic material.

11. A device for providing a physical demonstration of the mathematical formula for the area of the surface of a sphere comprising, a pair of concentric spheres, a pair of flat rings arranged orthogonally to each other encircling the outer surface of the inner sphere, said rings spacing the spheres from each other and dividing the inter-spherical space into four equal compartments, four hollow cylinders, each having an inner radius equal to the outer radius of the inner sphere and a rectangular cross-section in a normal plane through a diameter, the internal depth of said rectangular cross-section being equal to that of the inter-spherical space, each of said cylinders being spaced from said spheres, means providing an outlet in each of said four compartments, and hollow tubes, one connected to each of said outlets and to one of said cylinders to connect the compartments and the cylinders in elongated passageways and freely mobile fluid material in sufficient quantity to completely occupy the inter-spherical space and adapted to transfer through the passageways to the respective cylinders.

12. A device for providing a physical demonstration of the mathematical formula for the area of the surface of a sphere comprising, a pair of concentric spheres, a pair of flat rings arranged orthogonally to each other encircling the outer surface of the inner sphere, said rings spacing the spheres from each other and dividing the inter-spherical space into four equal compartments, four hollow cylinders, each having an inner radius equal to the outer radius of the inner sphere and a rectangular cross-section in a normal plane through a diameter, the internal depth of said rectangular cross section being equal to that of the interspherical space, each of said cylinders being secured to a different compartment, means comprising apertures directly connecting the cylinders with the respective compartment, and freely mobile fluid material in sufficient quantity to completely occupy the inter-spherical space and adapted to transfer directly to the adjacent cylinder.

References Cited in the file of this patent

UNITED STATES PATENTS

| | | |
|---|---|---|
| 296,018 | Kennedy | Apr. 1, 1884 |

FOREIGN PATENTS

| | | |
|---|---|---|
| 22,006 | Great Britain | 1903 |
| 537,089 | France | Feb. 24, 1922 |